(12) United States Patent
DeHart

(10) Patent No.: US 8,319,852 B2
(45) Date of Patent: Nov. 27, 2012

(54) METHOD, SYSTEM AND APPARATUS FOR MANAGING NOTIFICATION PROFILES USING GRAPHICAL INDICATORS

(75) Inventor: Brandon James DeHart, Campbell River (CA)

(73) Assignee: Research In Motion Limited, Waterloo (CA)

(*) Notice: Subject to any disclaimer, the term of this patent is extended or adjusted under 35 U.S.C. 154(b) by 304 days.

(21) Appl. No.: 12/700,341

(22) Filed: Feb. 4, 2010

(65) Prior Publication Data

US 2011/0187881 A1  Aug. 4, 2011

(51) Int. Cl.
*H04N 5/228* (2006.01)
(52) U.S. Cl. ............... 348/222.1; 348/14.01; 348/14.03; 348/207.1
(58) Field of Classification Search ............... 348/207.1, 348/222.1, 14.01, 14.03
See application file for complete search history.

(56) References Cited

U.S. PATENT DOCUMENTS

| 2002/0039909 A1* | 4/2002 | Rankin ........................ 455/558 |
| 2005/0069107 A1* | 3/2005 | Tanaka et al. ............... 379/93.17 |
| 2008/0266439 A1* | 10/2008 | Okazaki ................... 348/333.01 |

FOREIGN PATENT DOCUMENTS

| EP | 1156646 A1 | 11/2001 |
| WO | 2009/146860 A1 | 12/2009 |

OTHER PUBLICATIONS

European Patent Application No. 10 15 2649 Search Report dated Jul. 14, 2010.

* cited by examiner

*Primary Examiner* — Usman Khan
(74) *Attorney, Agent, or Firm* — Perry + Currier Inc.; Kristjan Spence

(57) ABSTRACT

According to embodiments described in the specification, a method, system and apparatus for managing notification profiles is provided. The method comprises acquiring, at an image acquisition module of a portable electronic device, an image of a graphical indicator. The graphical indicator comprises a machine readable representation of data identifying one of the plurality of notification profiles. The method further comprises extracting from the image the data identifying one of a plurality of notification profiles maintained in a memory of the portable electronic device. The method further comprises selecting the one of the plurality of notification profiles corresponding to the extracted identifying data as an active notification profile.

7 Claims, 4 Drawing Sheets

METHOD, SYSTEM AND APPARATUS FOR MANAGING NOTIFICATION PROFILES USING GRAPHICAL INDICATORS

FIELD

The specification relates generally to notification profiles, and specifically to a method, system and apparatus for managing notification profiles in a portable electronic device.

BACKGROUND

Portable communication devices, such as cellular phones and personal digital assistants ("PDA") are widely used for a variety of communications. For example, email messages and voice calls can be sent and received at such devices.

These devices can be configured to generate different notifications in response to events such as incoming communications. The configuration of which notifications are to be generated in such devices in response to incoming communications can be accomplished in a variety of ways. However, there remain situations in which currently available configuration mechanisms are insufficient.

BRIEF DESCRIPTIONS OF THE DRAWINGS

Embodiments are described with reference to the following figures, in which.

DETAILED DESCRIPTION OF THE EMBODIMENTS

An aspect of the specification provides a method of managing notification profiles on a portable electronic device having a processor in communication with an image acquisition module and a memory, the memory containing a plurality of notification profiles, the method comprising acquiring, at the image acquisition module, an image of a graphical indicator, the graphical indicator comprising a machine readable representation of data identifying one of the plurality of notification profiles; extracting from the image the data identifying one of the plurality of notification profiles; selecting the one of the plurality of notification profiles corresponding to the extracted identifying data as an active notification profile.

Another aspect of the specification provides a portable electronic device, comprising: an image acquisition module for acquiring images; a memory for maintaining a plurality of notification profiles; a processor in communication with the image acquisition module and the memory, the processor configured to receive, from the image acquisition module, an image of a graphical indicator, the graphical indicator comprising a machine readable representation of data identifying one of the plurality of notification profiles; the processor further configured to extract from the image the data identifying one of the plurality of notification profiles; the processor further configured to select the one of the plurality of notification profiles corresponding to the extracted identifying data as an active notification profile.

A further aspect of the specification provides a computer readable storage medium for storing computer readable instructions for execution by a processor, the computer readable instructions implementing the steps of the method.

A still further aspect of the specification provides a system for managing notification profiles on a portable electronic device, comprising a plurality of graphical indicators each comprising a machine readable representation of data identifying one of a plurality of notification profiles; and the portable electronic device.

Figure 1:
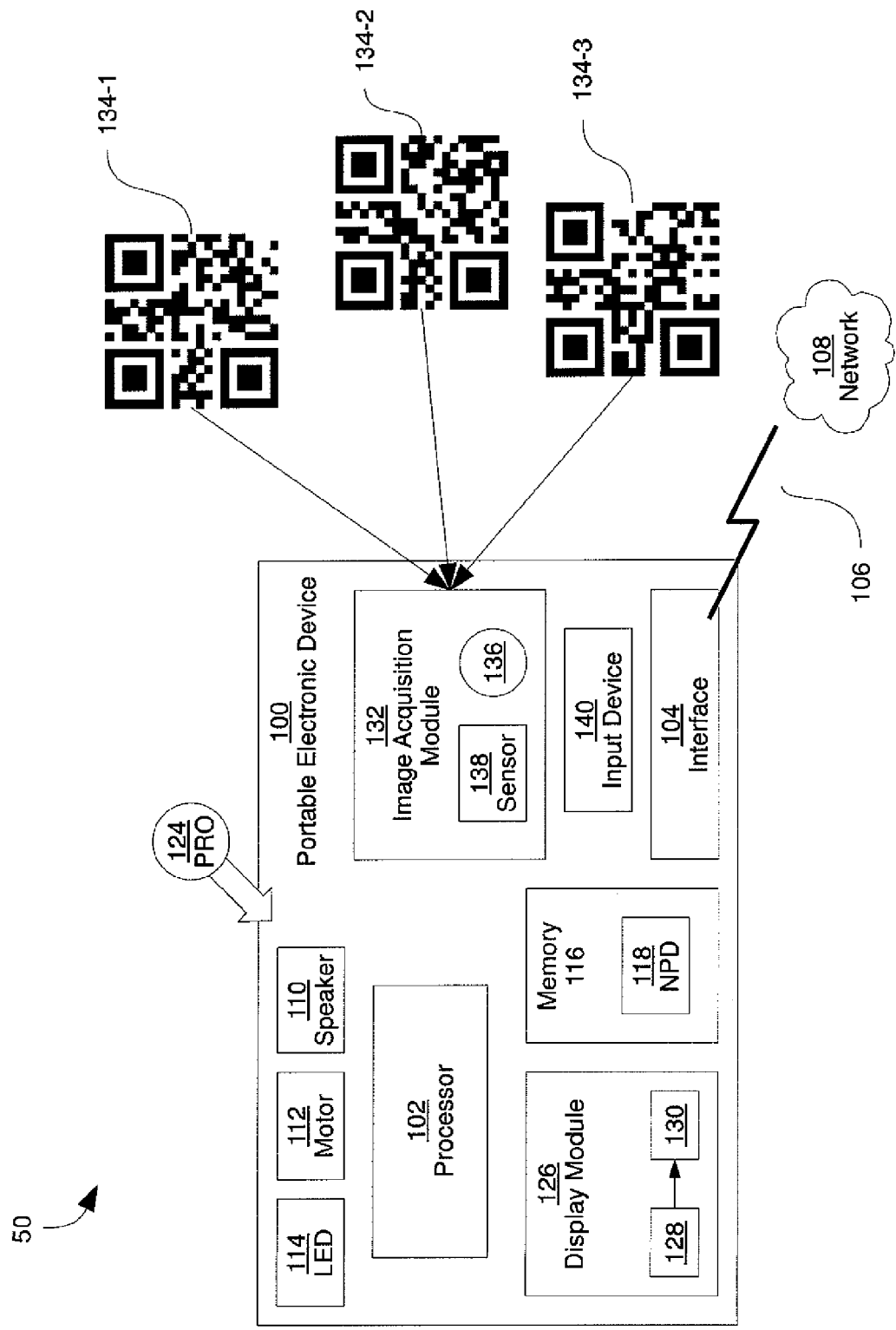
FIG. 1 depicts a schematic block diagram of a system for managing notification profiles, according to a non-limiting embodiment.

FIG. 1 depicts a system 50 for managing notification profiles in a portable electronic device 100. In the present embodiment, portable electronic device 100 is based on the computing environment and functionality of a hand-held wireless communication device. It will now be apparent, however, that portable electronic device 100 is not limited to a hand-held wireless communication device. Other portable electronic devices are also possible, such as cellular telephones, smart telephones, and laptop computers.

Portable electronic device 100 includes a processor 102 interconnected with an interface 104 by way of a communication bus (not shown). Interface 104 provides wireless or wired communication capabilities, or both wireless and wired communication capabilities, to portable electronic device 100, by way of a link 106 connecting portable electronic device 100 to a network 108. In the case of wireless communication, link 106 can be a wireless link based on core mobile network infrastructure (e.g. Global System for Mobile communications ("GSM"); Code Division Multiple Access ("CDMA"); CDMA 2000; 3G; 4G). Link 106 can also be based on wireless local area network ("WLAN") infrastructures such as the Institute for Electrical and Electronic Engineers ("IEEE") 802.11 Standard (and its variants), Bluetooth or the like, or hybrids thereof.

It will be appreciated that portable electronic device 100 is generally enabled to send and receive a variety of communications. For example, email messages and voice calls can be received at interface 104 of portable electronic device 100 from network 54, via link 52. When, for example, an email message is received at portable electronic device 100, portable electronic device 100 is generally enabled to generate a notification signal.

Portable electronic device 100 includes, in a non-limiting embodiment, output devices such as a speaker 110, a motor 112 and a light emitting diode ("LED") 114. Speaker 110, motor 112 and LED 114 are interconnected with processor 102 over a communication bus (not shown), and are operable to generate notification signals. For example, speaker 110 can generate an audible notification signal, such as a ring-tone; motor 112 can generate a tactile notification signal by causing portable electronic device 100 to vibrate; and LED 114 can generate a visual notification signal, for example by flashing on and off.

It will now be apparent that a wide variety of notification signals and combinations thereof can be generated at portable electronic device 100, and that certain notification signals and combinations thereof can be preferable in certain situations. It will also be appreciated that notification signals can be generated in situations other than the receipt of communications. For example, calendar appointments and alarms can also cause portable electronic device 20 to generate notification signals.

Portable electronic device 100 includes a memory 116 interconnected with processor 102 via a communication bus (not shown), which can be read only memory ("ROM"), Electrically Eraseable Programmable Read Only Memory ("EEPROM"), flash memory, or Random Access Memory ("RAM"). It will be appreciated that memory 116 can also be any combination or hybrid of the afore-mentioned types of memory. Memory 116 can maintain a notification profile database ("NPD") 118 for use by processor 102 of portable electronic device 100 in controlling speaker 110, motor 112 and LED 114 (or any additional output devices which will occur to those skilled in the art) to generate various notification signals.

Figure 2:
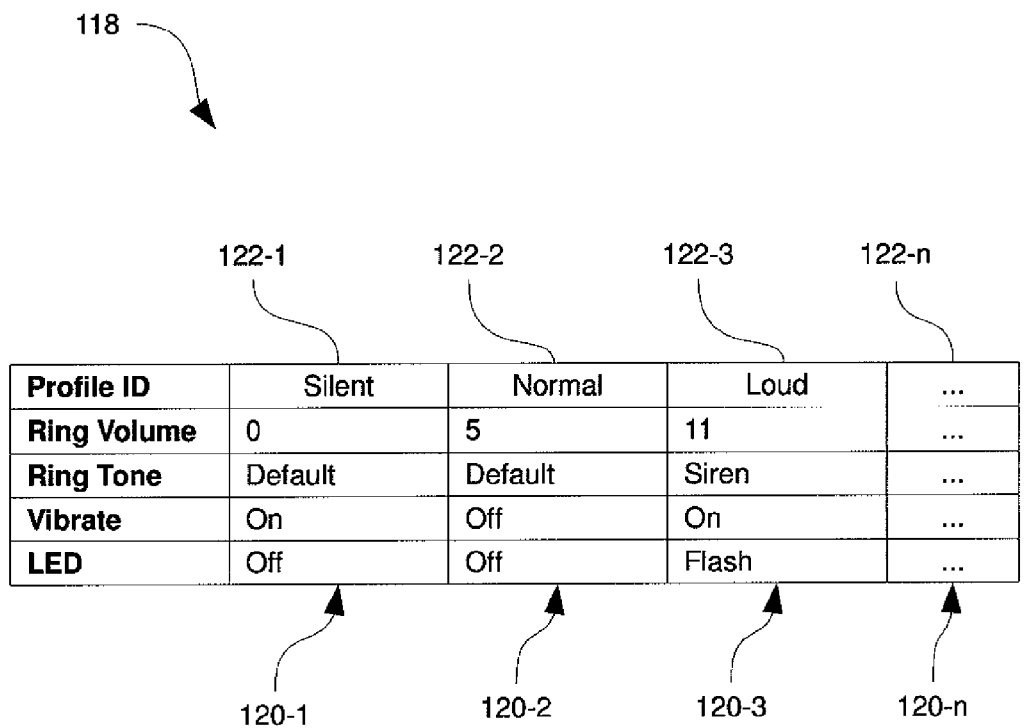
FIG. 2 depicts a notification profile database, according to a non-limiting embodiment.

Referring now to FIG. 2, a non-limiting example of NPD 118 is depicted. It will be appreciated that while NPD 118 is shown in tabular format, other suitable formats may also occur to those skilled in the art, and are intended to fall within the scope of the specification.

NPD 118 includes a plurality of notification profiles 120-1, 120-2, 120-3, ... 120-n (collectively, notification profiles 120 and generically, notification profile 120). Each notification profile 120 within NPD 118 contains notification settings which configure processor 102 to control the various output devices of portable electronic device 100 (e.g. speaker 110, motor 112, LED 114) in generating notification signals. For example, notification profile 120-2 configures processor 102 to control speaker 110 to generate an audible notification signal with the ring tone "default" and a volume of "5." It will now be apparent to those skilled in the art that additional parameters can also be specified in notification profiles 120 (for example, the frequency and duration of flashing by LED 114).

Each notification profile 120 also includes a profile identifier 122. Each profile identifier 122 uniquely identifies a corresponding one of notification profiles 120. For example, notification profile 120-2 includes profile identifier 122-2, "Normal."

It will now be apparent to those skilled in the art that any one of notification profiles 120 can be "active" at a given time. The active one of notification profiles 120 determines which notification signals are generated by the output devices of portable electronic device 100, as will be discussed in greater detail below.

Returning to FIG. 1, portable electronic device 100 also includes a profile management application ("PRO") 124, which can be stored in memory 116 and processed by processor 102. Upon processing profile management application 124, portable electronic device 100 is configured to manage notification profiles 120, including the selection of an active one of notification profiles 120 and the controlling of output devices (for example, speaker 110, motor 112, LED 114) in generating notification signals based on the notification settings of the active one of notification profiles 120.

Still referring to FIG. 1, portable electronic device 100 also includes a display module 126 interconnected with processor 102 via a communication bus (not shown). Display module 126 comprises circuitry 128 for generating a representation 130, for example of profile management application 124. It will now be apparent to those skilled in the art that display module 126 can include a flat panel display (e.g. liquid crystal display ("LCD"), plasma, and the like), a cathode ray tube ("CRT"), and the like.

Portable electronic device 100 is enabled to acquire, at an image capture module 132, an image of any one of graphical indicators 134-1, 134-2 or 134-3 associated with notification profiles 120. Image capture module 132 includes a lens or aperture 136, as well as an image sensor 138. As will be appreciated, image sensor 138 can be any of a variety of image sensors, such as, for example, a Charge-Coupled Device ("CCD") or a Complementary Metal-Oxide-Semiconductor ("CMOS").

Image acquisition module 132 can be controlled by processor 112 to acquire an image in response to input data received at an input device 140. Input device 140 can comprise any suitable input device for accepting input data. For example, input device 140 can include button(s), a keypad, a track ball, a scroll wheel and any combination thereof. It will be understood that input device 140 can also comprise other suitable devices that will occur to those skilled in the art, and that the above examples are not limiting. As a further example, input device 140 can include a touch screen integrated with display module 126.

Input data received at input device 140 thus configures processor 112 to control image acquisition module 132 to acquire an image of one of graphical indicators 134. The acquired image can be stored, for example in memory 116. Graphical indicators 134 can be any optical machine readable representation of data identifying any one of notification profiles 120 in NPD 118. For example, graphical indicators 134 can include a linear barcode (e.g. Universal Product Code or UPC), a two-dimensional barcode (e.g. Quick Response or QR Code) and the like. In a present non-limiting embodiment, grapical indicators 134 are two-dimensional barcodes with profile identifiers 122 encoded therein. In the particular example of FIG. 1, graphical identifier 134-1 represents profile identifier 122-1, "Silent." Graphical indicator 134 is therefore a machine readable representation of data identifying notification profile 120-1. Likewise, graphical indicators 134-2 and 134-3 represent data identifying notification profiles 120-2 and 120-3, respectively.

In general, following acquisition of an image, processor 112 as configured by profile management application 124 can process the image to extract data identifying a notification profile 120. Processor 112 can then select the notification profile 120 identified by graphical indicator 134 as the active profile.

Figure 3:
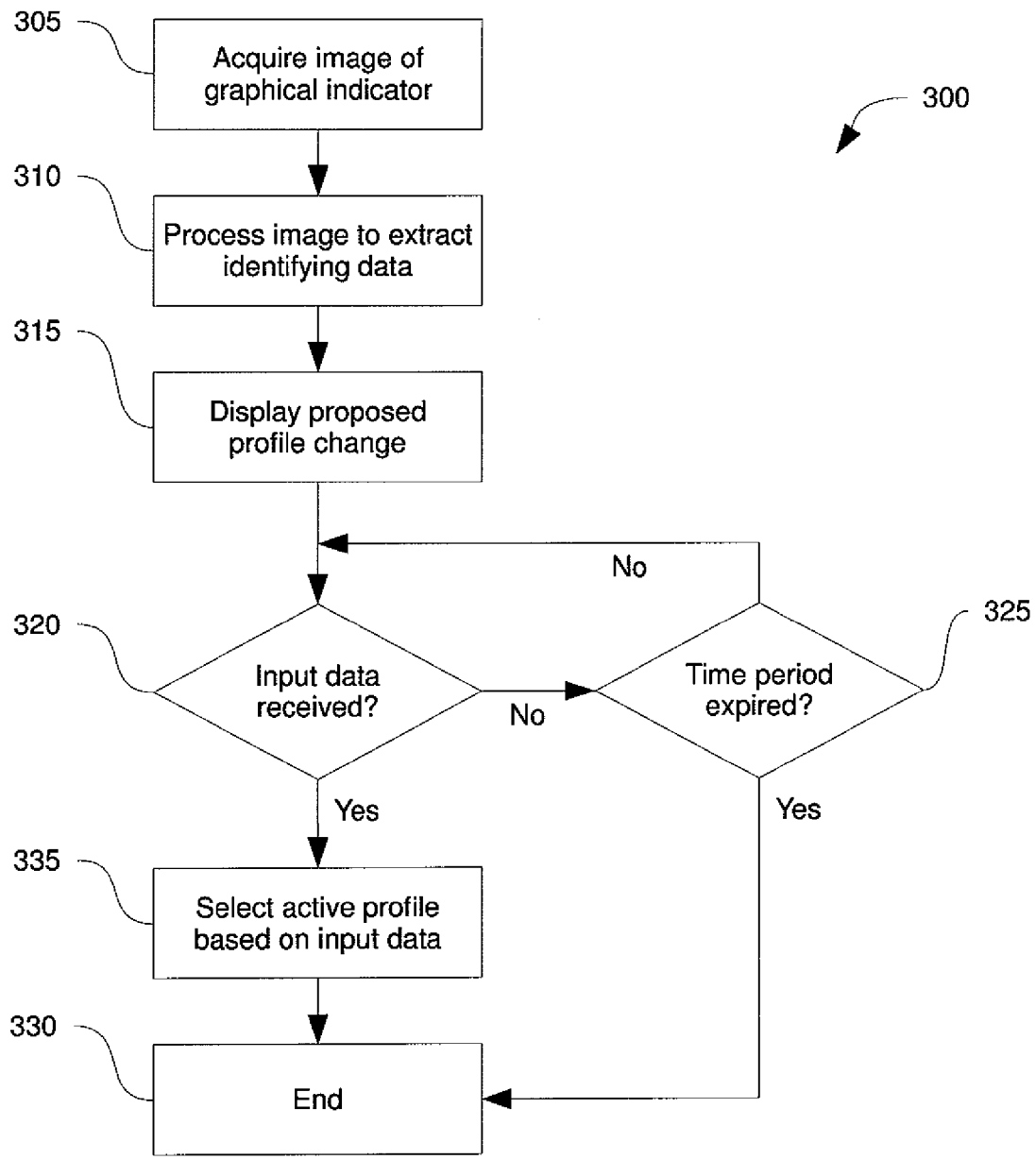
FIG. 3 depicts a method for managing notification profiles, according to a non-limiting embodiment.

Referring now to FIG. 3, a method 300 is depicted for managing notification profiles in a portable electronic device. In order to assist in the explanation of method 300, method 300 will be described in conjunction with its exemplary performance on system 100. The following discussion of method 300 will also lead to a further understanding of system 100 and the various components thereof. It will be appreciated, however, that system 100 and method 300 can be varied, and need not operate exactly as described herein in conjunction with each other.

Method 300 begins at block 305 with the acquisition of an image of one of grapical indicators 134. The acquired image can be stored in memory 116 for further processing, as will be described below. It will now be apparent that graphical indicators 134 can be generated previously at any suitable computing device, using profile identifiers 122 as input. Following generation, graphical indicators 134 can be displayed, for example by printing and affixing to any of a variety of surfaces. In the present embodiment, graphical indicator 134-1 can be affixed to an entrance into a meeting room; graphical indicator 134-2 can be affixed to an entrance into an office, and graphical indicator 134-3 can be affixed to an entrance into a cafeteria or lunchroom. It will be understood that these are merely examples, and that many other configurations will occur to those skilled in the art. In general, it will now be apparent that a graphical indicator 134 can be placed at any location where it may be desirable to select a new active notification profile at portable electronic device 100.

Following acquisition of an image of, for example, graphical indicator 134-1 at image acquisition module 132, method 300 proceeds to block 310. At block 310, the acquired image of graphical indicator 134-1 is processed at processor 102, executing profile management application 124, to extract data identifying a notification profile 120. In this exemplary performance of method 300, processor 102 processes the acquired image to extract profile identifier 122-1, or "Silent."

It will now be apparent that graphical indicators 134 need not encode profile identifiers 122. In other exemplary embodiments, graphical indicators 134 could instead encode a wide variety of other identifying data for notification profiles 120, such as numerical values, character strings and the like. If such other identifying data were used, additional columns (not shown) could be included in NPD 118 to incorporate such data. As a further alternative, an additional mapping table (not shown) could be stored in memory 116, containing mappings between identifying data and corresponding ones of profile identifiers 122.

Figure 4:
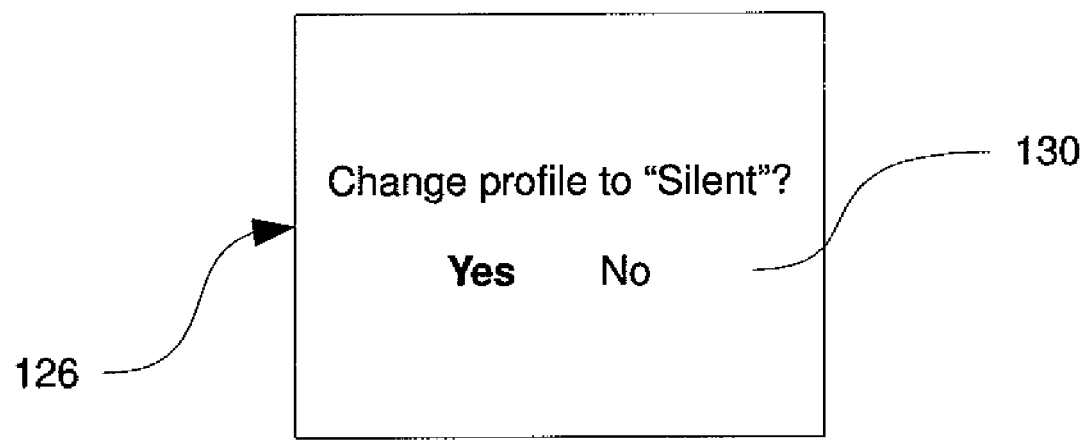
FIG. 4 depicts a representation generated by a display module of the system of FIG. 1, according to a non-limiting embodiment.

Following extraction of identifying data, method 300 proceeds to block 315. At block 315, representation 130 is generated or updated by display module 126, as shown in FIG. 4. FIG. 4 shows representation 130 generated by display module 126 for the identifying data extracted at block 310. In particular, representation 130 includes profile identifier 122-1 along with a query for whether or not to confirm the selection of the "Silent" notification profile as the active notification profile.

Returning to FIG. 3, method 300 proceeds to block 320, at which a determination is made as to whether or not input data has been received at input device 140. If no input data is received, method 300 proceeds to block 325, at which a further determination is made. If it is determined at block 325 that a predetermined time period has expired, method 300 ends at block 330 with no selection of a new active notification profile having been made. If, on the other hand, it is determined at block 325 that the predetermined time period has not expired, method 300 returns to block 320.

It will now be apparent that the predetermined time period mentioned above can be any of a wide variety of time periods, and can be set in a variety of ways, as will occur to those skilled in the art. For example, the predetermined time period can be set via input data received at input device 140.

If it is determined at block 320 that input data has been received, method 300 proceeds to block 335. At block 335, an active notification profile is selected based on the received input data. In particular, referring to FIG. 4, if affirmative input data is received (as indicated by the bold "Yes" option in representation 130), notification profile 120-1 corresponding to the identifying data extracted at block 310 is selected as the active notification profile. Otherwise, if the received input data is negative (e.g. the "No" option of representation 130 as shown in FIG. 4), no new active notification profile is selected; that is, whatever the active notification profile was before the performance of method 300 remains the active notification profile.

Referring back to FIG. 3, method 300 then proceeds to block 330, at which method 300 ends. At block 330, memory 116 can be cleared of the image acquired at block 305, thus releasing memory resources for other tasks.

It is noted that, in another exemplary embodiment (not shown), if it is determined at block 325 that a predetermined time period has expired, the notification profile corresponding to the identifying data extracted at block 310 can be automatically selected before method 300 proceeds to block 330.

In a further exemplary embodiment (not shown), blocks 315, 320 and 325 can be omitted. In such an embodiment, method 300 can proceed directly from block 315 to block 335, at which the notification profile corresponding to the identifying data extracted at block 310 is selected immediately as the active notification profile.

Those skilled in the art will appreciate that in some embodiments, the functionality of portable electronic device 100 can be implemented using pre-programmed hardware or firmware elements (e.g., application specific integrated circuits (ASICs), electrically erasable programmable read-only memories (EEPROMs), etc.), or other related components. In other embodiments, the functionality of portable electronic device 100 can be achieved using a computing apparatus that has access to a code memory (not shown) which stores computer-readable program code for operation of the computing apparatus. The computer-readable program code can be stored on a computer readable storage medium which is fixed, tangible and readable directly by the computing apparatus, such as a removable diskette, CD-ROM, ROM, fixed disk, USB drive and the like. The computer-readable program code can alternatively be stored remotely but transmittable to the computing apparatus via a modem or other interface connected to a network (including, without limitation, the Internet) over a transmission medium. The transmission medium can be a wired medium (e.g., optical or analog communications lines), or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method of managing notification profiles on a portable electronic device having a processor in communication with an image acquisition module, a display module, an input device and a memory, the memory containing a plurality of notification profiles, the method comprising:
   acquiring, at the image acquisition module, an image of a graphical indicator, the graphical indicator comprising a machine readable representation of data identifying one of the plurality of notification profiles;
   extracting from the image the data identifying one of the plurality of notification profiles;
   generating, at the display module, representation data for the one of the plurality of notification profiles corresponding to the extracted identifying data;
   determining whether input data has been received at the input device;
   when affirmative input data is received, selecting the one of the plurality of notification profiles corresponding to the extracted identifying data as an active notification profile; and
   when negative input data is received, aborting the selection.

2. The method of claim 1, wherein if no input data is received at the input device within a pre-determined time period, selection is aborted.

3. A portable electronic device, comprising:
   an image acquisition module for acquiring images;
   a display module;
   an input device;
   a memory for maintaining a plurality of notification profiles;
   a processor in communication with the image acquisition module, the display module, the input device and the memory, the processor configured to receive, from the image acquisition module, an image of a graphical indicator, the graphical indicator comprising a machine readable representation of data identifying one of the plurality of notification profiles;

the processor further configured to extract from the image the data identifying one of the plurality of notification profiles;

the processor further configured to generate at the display module representation data for the one of the plurality of notification profiles corresponding to the extracted identifying data;

the processor further configured to determine whether input data has been received at the input device;

the processor further configured, when affirmative input data is received, to select the one of the plurality of notification profiles corresponding to the extracted identifying data as an active notification profile and, when negative input data is received, to abort the selection.

4. The portable electronic device of claim 3, the processor further configured to abort the selection if no input data is received at the input device within a pre-determined time period.

5. A non-transitory computer readable storage medium for storing computer readable instructions for execution by a processor, the computer readable instructions implementing the steps of:

acquiring, at an image acquisition module of a portable electronic device, an image of a graphical indicator, the graphical indicator comprising a machine readable representation of data identifying one of a plurality of notification profiles maintained in a memory of the portable electronic device;

extracting from the image the data identifying one of the plurality of notification profiles;

generating, at a display module, representation data for the one of the plurality of notification profiles corresponding to the extracted identifying data;

determining whether input data has been received at an input device;

when affirmative input data is received, selecting the one of the plurality of notification profiles corresponding to the extracted identifying data as an active notification profile; and when negative input data is received, aborting the selection.

6. The non-transitory computer readable storage medium of claim 5, wherein if no input data is received at the input device within a pre-determined time period, selection is aborted.

7. A system for managing notification profiles on a portable electronic device, comprising:

a plurality of graphical indicators each comprising a machine readable representation of data identifying one of a plurality of notification profiles; and a portable electronic device, comprising:

an image acquisition module for acquiring images;

a display module;

an input device;

a memory for maintaining a plurality of notification profiles;

a processor in communication with the image acquisition module, the display module, the input device and the memory, the processor configured to receive, from the image acquisition module, an image of a graphical indicator, the graphical indicator comprising a machine readable representation of data identifying one of the plurality of notification profiles;

the processor further configured to extract from the image the data identifying one of the plurality of notification profiles;

the processor further configured to generate at the display module representation data for the one of the plurality of notification profiles corresponding to the extracted identifying data;

the processor further configured to determine whether input data has been received at the input device;

the processor further configured, when affirmative input data is received, to select the one of the plurality of notification profiles corresponding to the extracted identifying data as an active notification profile and, when negative input data is received, to abort the selection.

* * * * *